United States Patent
Wang et al.

(10) Patent No.: US 7,330,592 B2
(45) Date of Patent: *Feb. 12, 2008

(54) METHOD AND APPARATUS FOR DETECTING THE LOCATION AND LUMINANCE TRANSITION RANGE OF SLANT IMAGE EDGES

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 742 days.

This patent is subject to a terminal disclaimer.

(21) Appl. No.: 10/765,529

(22) Filed: Jan. 27, 2004

(65) Prior Publication Data

US 2005/0163380 A1 Jul. 28, 2005

(51) Int. Cl.
*G06K 9/48* (2006.01)
*G06K 9/40* (2006.01)
(52) U.S. Cl. ............... 382/199; 382/269
(58) Field of Classification Search ........... 382/181, 382/195, 199, 266, 269; 348/625, 627–629
See application file for complete search history.

(56) References Cited

U.S. PATENT DOCUMENTS

| 4,853,970 | A  | * | 8/1989  | Ott et al. ............ 382/266 |
| 6,304,269 | B1 | * | 10/2001 | Ito .................... 345/589 |
| 6,477,282 | B1 | * | 11/2002 | Ohtsuki et al. ....... 382/266 |
| 6,982,723 | B1 | * | 1/2006  | Szymaniak ........... 345/611 |
| 2004/0189874 | A1 |   | 9/2004  | Wang et al. .......... 348/627 |

* cited by examiner

*Primary Examiner*—Colin LaRose
(74) *Attorney, Agent, or Firm*—Kenneth L. Sherman, Esq.; Michael Zarrabian, Esq.; Myers Dawes Andras & Sherman, LLP

(57) ABSTRACT

A system and method for detecting location and luminance transition range of slant image edge in a digital image. The variance value for the pixels inside a window in the image is calculated, based on which a current pixel is classified. If the current pixel is in a non-edge region, no further checking is needed, otherwise binary pattern data is generated from the pixels inside the window. Then it is determined whether the current pixel is a center pixel in a luminance transition range of a slant edge based on the binary pattern data at the current pixel location and its neighboring binary pattern data. If the current pixel is the center pixel in a luminance transition range of a slant edge, then the length of the luminance transition range of the slant edge is determined.

30 Claims, 8 Drawing Sheets

100

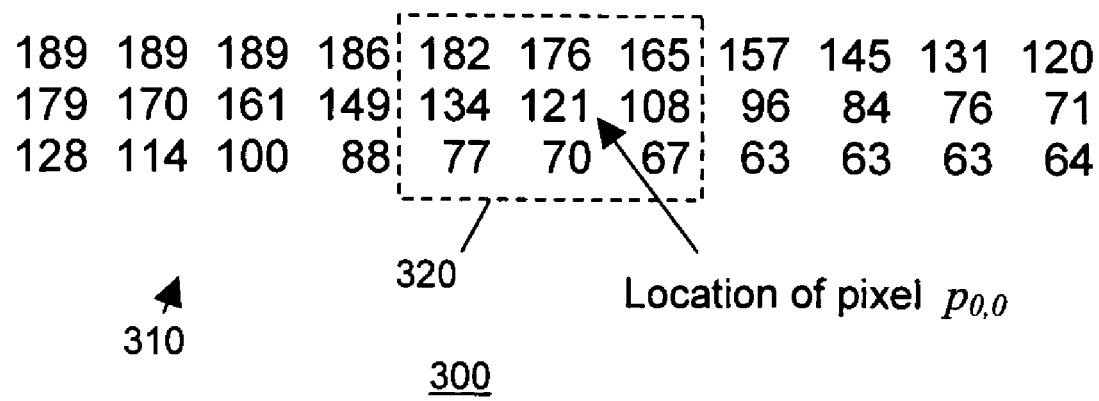
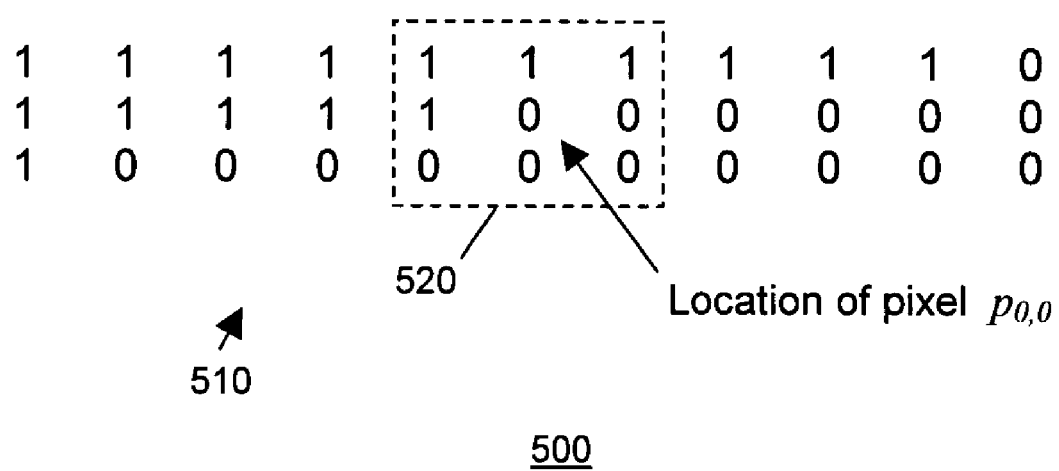

FIG 6

| | | | |
|---|---|---|---|
| 0 0 1<br>0 1 1<br>1 1 1<br>(a) | 1 0 0<br>1 1 0<br>1 1 1<br>(b) | 1 1 1<br>1 1 0<br>1 0 0<br>(c) | 1 1 1<br>0 1 1<br>0 0 1<br>(d) |
| 1 1 0<br>1 0 0<br>0 0 0<br>(e) | 0 1 1<br>0 0 1<br>0 0 0<br>(f) | 0 0 0<br>0 0 1<br>0 1 1<br>(g) | 0 0 0<br>1 0 0<br>1 1 0<br>(h) |

600

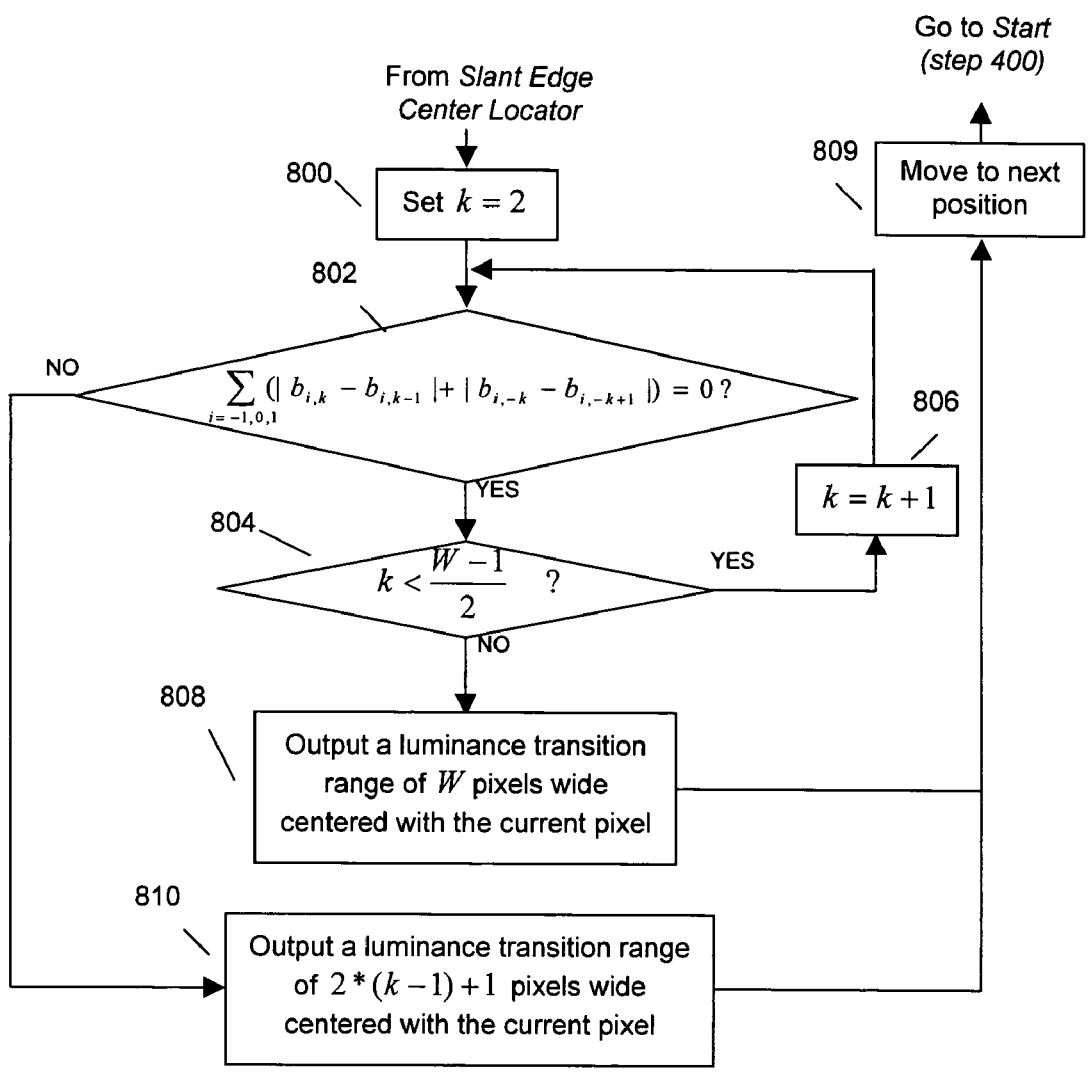

METHOD AND APPARATUS FOR DETECTING THE LOCATION AND LUMINANCE TRANSITION RANGE OF SLANT IMAGE EDGES

FIELD OF THE INVENTION

The present invention relates to image detail enhancement, and in particular, to detecting the location as well as the luminance transition range of slant image edges in digital images.

BACKGROUND OF THE INVENTION

In digital image systems (such as digital TV systems), in order to boost video quality, images are often enhanced in many different aspects, such as image details, image contrast, etc., before being displayed. For a digital image, the quality of edges in the image (i.e., image edges) is of great importance to the overall image quality. Therefore, during the enhancement processes, each image edge should be well preserved. In other words, image enhancement should not sacrifice image edge quality. Otherwise, the overall visual quality of the image may be degraded even though the image is enhanced in certain aspects.

An instance of such visual quality degradation is a zigzagged edge artifact due to conventional image detail enhancement. As the goal of image detail enhancement is to improve the image sharpness, high frequency image components that contain image details are extracted, enhanced and then added back to the original image. As a result, image details in the processed image become more obvious than those in the original image. However, some artifacts can also be introduced into image edges because of the enhancement.

An example of the zigzagged edge artifact is described in conjunction with FIGS. 1A-B. FIG. 1A shows an original image edge 10, wherein each small rectangular/square block 11 in the edge 10 represents one image pixel. The edge direction has a low angle relative to the horizontal direction. Along the horizontal direction across the edge, there is a long luminance transition range 12 from dark area to bright area or vice versa, as indicated in FIG. 1A. The luminance transition range 12 refers to the length of the luminance transitioning area of an edge either along the horizontal direction or along the vertical direction across the edge. The boundary of the edge shown in FIG. 1A looks generally smooth even though the edge has a limited image resolution.

A conventional image detail enhancement process is applied to the image edge 10 of FIG. 1A to generate the enhanced image 14 in FIG. 1B. Because in an image detail enhancement process high frequency components are boosted, the luminance transition range 12 may become shorter (or sharper). As can be seen in FIG. 1B, the luminance transition range 12 along the horizontal direction has become much shorter relative to that in FIG. 1A. As a consequence, the edge boundary now includes zigzagged edge artifacts. The more the image is enhanced in the detail enhancement process, the more obvious this kind of artifact would be. As a result, even though the image in FIG. 1B is enhanced, the quality of the image looks poor due to the degradation of edge quality.

The problem shown in FIG. 1B exists for most slant image edges. A slant image edge refers to an image edge whose direction is not exactly vertical or horizontal. Only when an image edge has exactly vertical or horizontal or precisely ±45° (i.e. +45° or −45°) direction, it is immune to the problem shown in FIG. 1B. Otherwise, a slant image edge can develop zigzagged artifacts if it is enhanced substantially. The closer its direction is to horizontal or vertical direction, the easier it is for a slant image edge to develop zigzagged edge artifact when enhanced substantially and the more obvious the artifact would be.

Therefore, there is a need for a method of detecting the location and the luminance transition range of slant image edges so that pixels belonging to a slant edge can be processed separately or differently from the other image areas to avoid possible edge artifact.

BRIEF SUMMARY OF THE INVENTION

The present invention addresses the above needs. In one embodiment, the present invention provides a method that can be used for detecting the location and luminance transition range of slant image edges in a digital image so that pixels belonging to each slant edge can be processed separately. In one example, the detection method is conducted on a pixel basis, wherein each pixel is checked together with its neighboring pixels inside a rectangular window centered with the current pixel.

Such a detection method includes four main processes, identified as an Edge Region Detector, a Binary Pattern Data Generator, a Slant Edge Center Locator and a Luminance Transition Range Detector. In the Edge Region Detector, the variance value for the pixels inside said rectangular window is calculated. Based on the variance value, a current pixel can be classified as being in an edge region or in a non-edge region. If the current pixel is in a non-edge region, no further checking is needed. However, if the current pixel is in an edge region, then in the Binary Pattern Data Generator, binary pattern data is generated from the pixels inside the rectangular window.

Using binary data instead of the original image data greatly reduces the complexity of the detection process. Binary Pattern Data are generated based on the luminance value of each pixel inside the rectangular window and the mean luminance value of all the pixels inside the window.

In the Slant Edge Center Locator, it is determined whether the current pixel is a center pixel in a luminance transition range of a slant edge. This determination is based on the binary pattern data at the current pixel location and its e.g. eight immediate neighboring binary pattern data. Initially, a pattern matching process is performed to determine if the current pixel is the center pixel in a luminance transition range of a e.g. approximately ±45° direction edge. If it is, then no further processing is needed at the current pixel location and the luminance transition range is considered as 3 pixels wide.

Otherwise, if no pattern is matched, then still based on the nine binary pattern data (i.e., the binary data of the current pixel and the 8 neighboring pixels), another checking process is performed to determine whether the current pixel is a center pixel in a luminance transition range other than an approximately ±45° slant edge. If the current pixel is considered as a center pixel in a luminance transition range other than an approximately ±45° slant edge, then the Luminance Transition Range Detector is used to detect the exact length of the luminance transition range of the slant edge by checking more binary pattern data inside the rectangular window.

Through such detection processes, both the center position and the luminance transition range of slant image edge can be determined. These and other features, aspects and advantages of the present invention will become understood with reference to the following description, appended claims and accompanying drawings.

BRIEF DESCRIPTION OF THE DRAWINGS

FIG. 5A shows an example of image pixel data inside the window centered with a current pixel;

FIG. 5B shows an example corresponding binary data pattern generated from the pixel data shown in FIG. 5A;

FIG. 6 shows eight example patterns that can be used to detect ±45° slant image edge;

FIG. 8 shows an example flowchart of the steps for processing in an embodiment of the Luminance Transition Range Detector of FIG. 2.

DETAILED DESCRIPTION OF THE INVENTION

The present invention addresses the above needs. In one embodiment, the present invention provides a method for detecting the location and luminance transition range of slant image edges in a digital image, so that pixels belonging to each slant edge can be processed separately/differently than other image pixels.

As noted, in one implementation, the detection method is conducted on a pixel basis, wherein each pixel is checked together with its neighboring pixels inside a rectangular window centered with the current pixel. The variance value of the pixels inside the rectangular window centered with a current pixel is checked to determine if the current pixel is in an edge region or in a non-edge region. If the current pixel is in an edge region, then binary pattern data is generated from the pixels inside the rectangular window based on their mean value. Then using the binary pattern data, a pattern matching process is performed to determine whether the current pixel is a center pixel in a luminance transition range of an approximately ±45° direction edge. If the current pixel is not a center pixel in a luminance transition range of an approximately ±45° direction edge, then using the binary pattern data, another pattern matching process is performed to determine whether the current pixel is a center pixel in a luminance transition range other than an approximately ±45° direction edge. If the current pixel is determined to be a center pixel in a luminance transition range other than an approximately ±45° direction edge, then the exact luminance transition range is detected based on the binary pattern data, as described below in more detail.

Figure 1A:
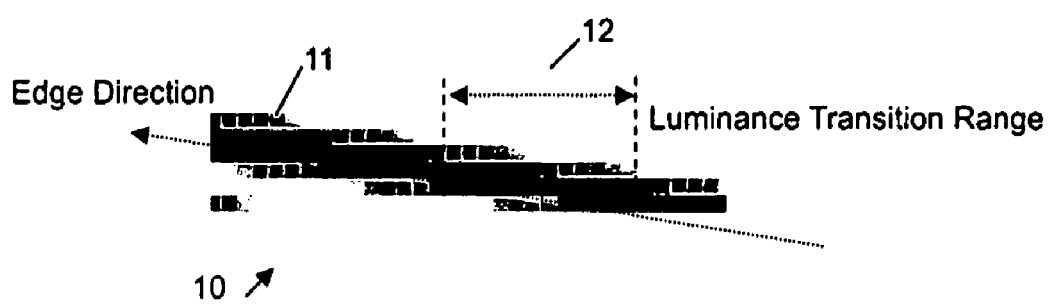
FIG. 1A shows an example smooth-looking image edge before detail enhancement.
Figure 1B:
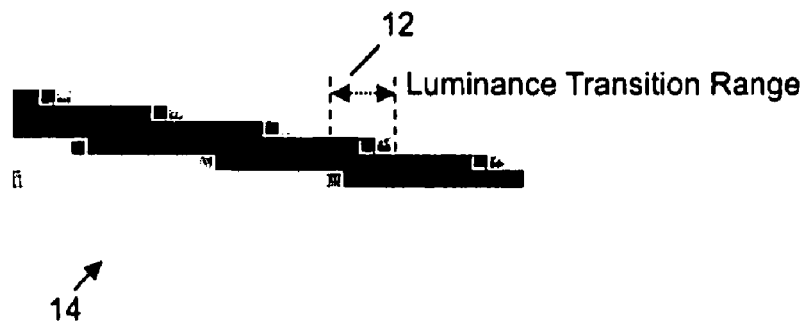
FIG. 1B shows the same edge in FIG. 1A after detail enhancement, wherein the edge becomes zigzagged due to enhancement.
Figure 2:
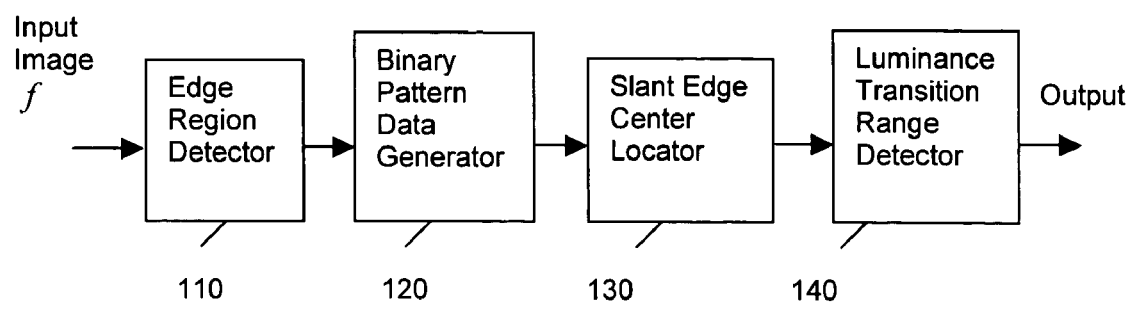
FIG. 2 shows an example block diagram of an embodiment of a detection system for detecting the center position and the luminance transition range of slant image edge, according to the present invention.

Referring to the example block diagram in FIG. 2, a detection system 100 implementing the above method of the present invention includes four processing blocks, identified in FIG. 2 as an Edge Region Detector 110, a Binary Pattern Data Generator 120, a Slant Edge Center Locator 130 and a Luminance Transition Range Detector 140. In the Edge Region Detector 110, the variance value for the pixels inside said rectangular window is calculated. Based on the variance value, a current pixel can be classified as being in an edge region or in a non-edge region. If the current pixel is in a non-edge region, no further checking is needed and a next pixel is processed. However, if the current pixel is in an edge region, then in the Binary Pattern Data Generator 120, binary pattern data is generated from the pixels inside the rectangular window.

Using the binary data instead of the original image data is to reduce the complexity of the detection process. In the example Slant Edge Center Locator 130 herein, using the binary pattern data it is determined whether the current pixel is a center pixel in a luminance transition range of a slant edge. In one example, the binary pattern data at the current pixel location and its neighboring pixels' binary pattern data (e.g., eight immediate neighboring pixels' binary pattern data), is used in a pattern matching process to determine if the current pixel is the center pixel in a luminance transition range of a e.g. approximately ±45° slant edge. If it is, then no further processing is needed at the current pixel location and the luminance transition range is considered as three pixels wide.

Otherwise, if no pattern is matched, then still based on the nine binary pattern data (i.e., the binary data of the current pixel and the 8 neighboring pixels), another pattern matching process is performed to determine whether the current pixel is a center pixel in a luminance transition range other than an approximately ±45° slant edge. If the current pixel is considered as a center pixel in a luminance transition range other than an approximately ±45° slant edge, then the Luminance Transition Range Detector 140 detects the length of the luminance transition range of the slant edge by checking more binary pattern data inside the rectangular window.

Through such a detection process as shown in FIG. 2 and described, both the center position and the luminance transition range of slant image edge can be determined. In the following, the functionality of each of the four processing blocks/modules in FIG. 2 is explained in more detail. At the outset, it is worth noting that preferably the processing according to FIG. 2 is performed twice at every pixel location, one for checking image edges whose direction is close to the horizontal direction and another for checking image edges whose direction is close to the vertical direction. The following, description is based on the case wherein the edge direction is close to the horizontal direction. However, similar steps are applicable to image edges whose direction is close to the vertical direction, by exchanging the processing of the rows and columns in the rectangular window.

Figure 3:
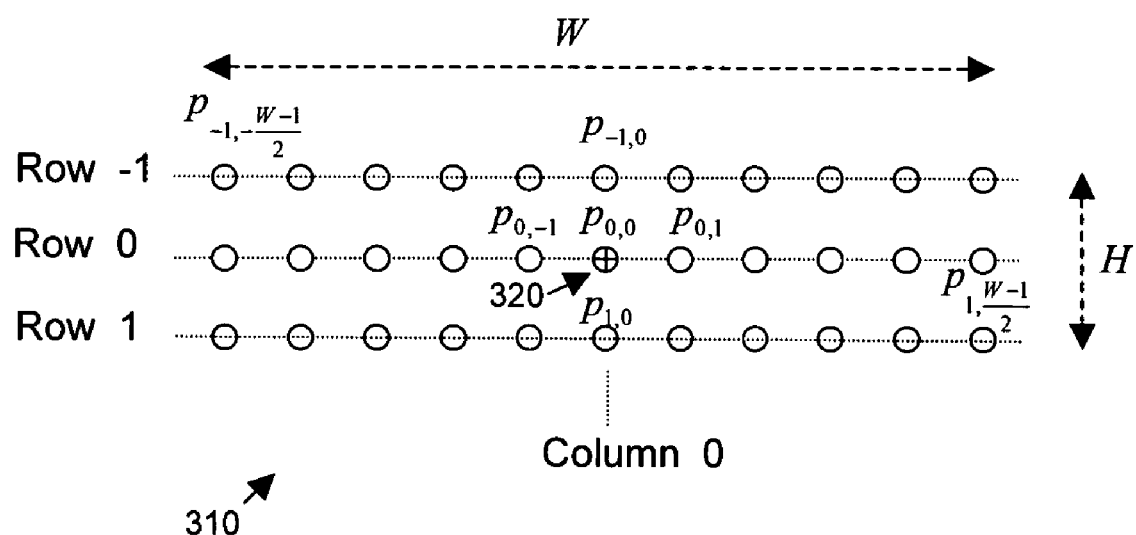
FIG. 3 shows a diagram of pixels inside an example window centered with a current/select pixel and its neighboring pixels, for the detection of slant image edge at the current pixel location.

FIG. 3 shows an example diagram of a rectangular window 300 including pixels 310 (i.e., p), wherein the window 300 is defined inside the original image. In this example, the window 300 is centered with a current/selected pixel 320. Only the pixels inside the rectangular window 300 are used for the detection of a slant image edge at the current pixel location. The rectangular window 300 has a dimension of W pixels along the horizontal direction and H pixels along the vertical direction, such that L is the total number of pixels 310 inside the rectangular window 300 (i.e., L=W*H). In this example, both H and W are odd numbers. Indices i and j are integer and represent the row and column index for the corresponding pixel, wherein $P_{i,j}$ denotes each pixel 310 inside the window 300, and each value $b_{i,j}$ denotes the corresponding binary pattern data.

As shown in FIG. 3, the detection is based on neighboring pixels within the rectangular window centered with the current pixel 320, designated as $p_{0,0}$. The current pixel $p_{0,0}$ is represented as a circle with a cross therein. The hollow circles represent neighboring pixels/samples of the current pixel $p_{0,0}$. Though eight immediate neighboring pixels are used in this example, as those skilled in the art will recognize, other number of neighboring pixels and at different positions relative to the current pixel $p_{0,0}$ may also be used.

To detect a slant edge in the window 300 whose direction is close to the horizontal direction, H takes a value of 3 and W takes a value larger than 3. As noted above, symmetrically, to detect a slant edge whose direction is close to the vertical direction, W takes a value of 3 and H takes a value larger than 3.

Figure 4:
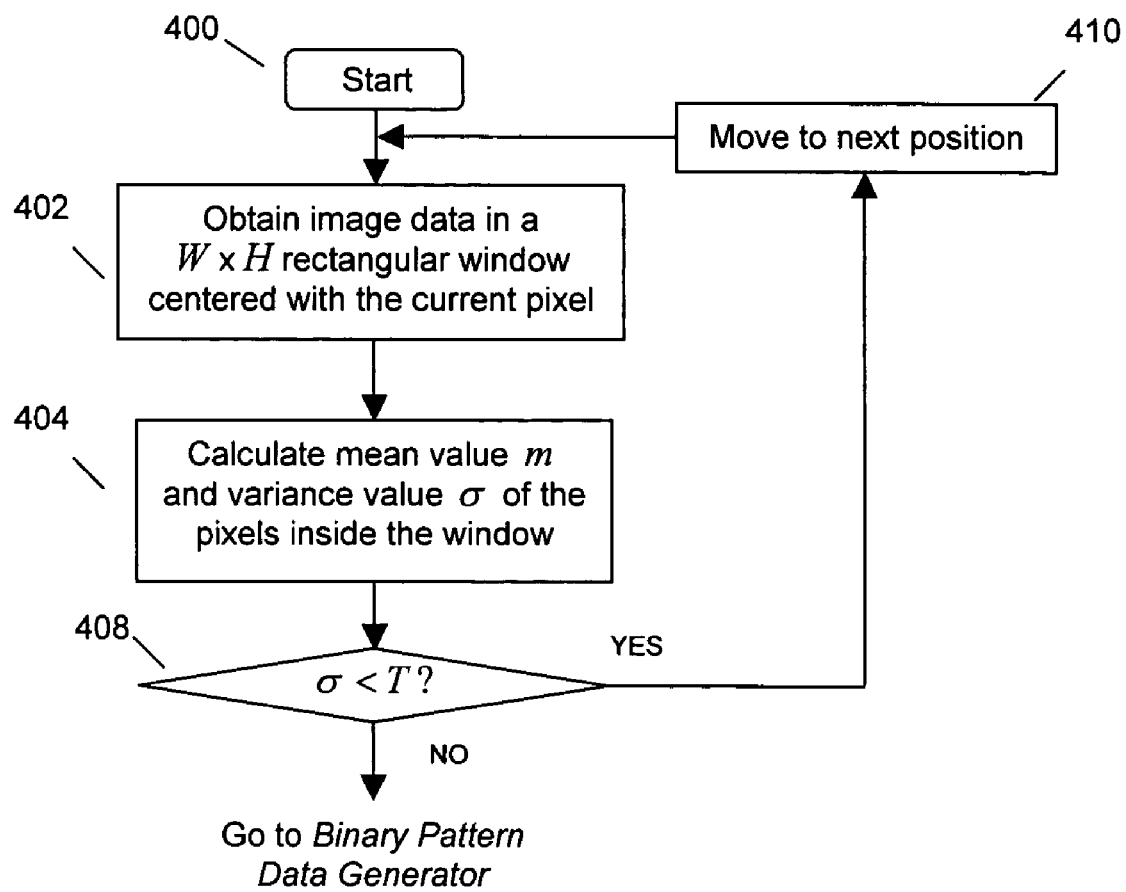
FIG. 4 shows an example flowchart of steps for processing in an embodiment of the Edge Region Detector of FIG. 2.

FIG. 4 shows example steps for determining if the current pixel is located in an edge region or not. Referring to the example steps in FIG. 4 in conjunction with the diagram of FIG. 3, at the starting step 400, the window 300 of pixels 310 is selected (step 402). In this example H=3, indicating that 3 rows of image pixels are utilized, and W has a larger value than 3 because it determines the maximum length of the luminance transition range that can be checked along horizontal direction. As such, in FIG. 3, W=11. The selected values for W and H are examples only, and other values can also be selected as those skilled in the art will appreciate.

As described, each pixel inside the window 300 is denoted as $p_{i,j}$. After selection of the window 300, the Edge Region Detector 110 in the detection system of FIG. 2, first checks whether the current pixel $p_{0,0}$ is in an edge region. To do so, a variance value σ is calculated based on a plurality of pixels around the current pixel $p_{0,0}$ in the rectangular window (step 404). The following is an example relation for calculating the variance value σ, wherein:

$$\sigma = \frac{1}{L} \sum_{i=-1,0,1} \sum_{j=-\frac{W-1}{2}}^{\frac{W-1}{2}} |I_{i,j} - m| \quad (1)$$

wherein, $I_{i,j}$ denotes the luminance value of pixel $p_{i,j}$, m is the mean value of said plurality of pixels inside the rectangular window 300, and is defined according to the following example relation:

$$m = \frac{1}{L} \sum_{i=-1,0,1} \sum_{j=-\frac{W-1}{2}}^{\frac{W-1}{2}} I_{i,j} \quad (2)$$

The variance value σ is then checked against a predetermined threshold T, wherein T≧0 (step 408). If σ is smaller than T, then the current pixel $p_{0,0}$ is considered to be in a non-edge region. In that case, no further checking is needed at the current pixel $p_{0,0}$ location and the process moves to the next pixel (step 410).

Figure 7:
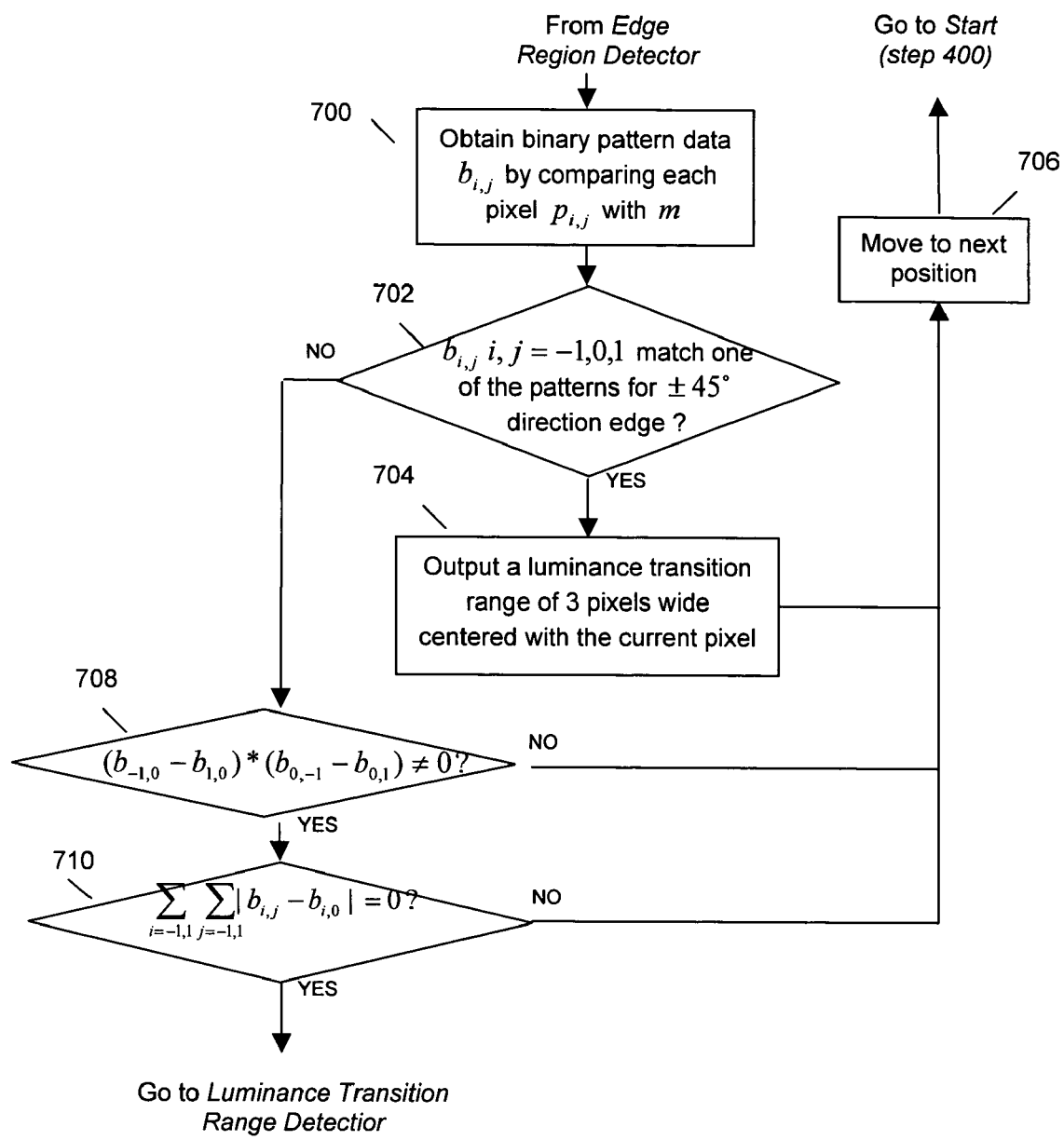
FIG. 7 shows an example flowchart of the steps for processing in an embodiment of the Binary Pattern Generator and the Slant Edge Center Locator of FIG. 2.

However, if the variance value σ is not less than the threshold T, the current pixel $p_{0,0}$ is considered as being in an edge region and the Binary Pattern Data Generator 120 is used to generate binary pattern data from the pixels in the window 300, as shown by the example diagrams in FIGS. 5A-B. In the description herein, the windows in FIGS. 3 and 5A-5B, are of the same dimensions and the values therein are indexed in rows and columns in the same manner as described in relation to FIG. 3. Now also referring to the example steps in FIG. 7, in order to generate the binary pattern data from the L pixels inside the rectangular window 300, in the Binary Pattern Data Generator 120 the luminance value $I_{i,j}$ of each pixel is compared with the mean value m (step 700), whereby the corresponding binary data can be generated according to the example relation:

$$b_{i,j} = \begin{cases} 0 & \text{if } I_{i,j} < m \\ 1 & \text{if } I_{i,j} \geq m \end{cases} \quad (3)$$

FIG. 5A shows example image pixel data in said window 300 of FIG. 3, centered around the current pixel $p_{0,0}$, as indicated. In the example shown in FIG. 5A, pixel luminance is in a range of [0, 255]. A value of $I_{i,j}$=255 represents the brightest luminance level and a value of $I_{i,j}$=0 represents the darkest luminance level. Using the above relations, the mean value m is calculated to be 123 for the pixel values in FIG. 5A, wherein the diagram in FIG. 5B shows a pattern 500 of binary data 510 generated from the pixel data shown in FIG. 5A according to relation (3).

Then, in the Slant Edge Center Locator 130 of FIG. 2, the binary data values in the pattern 500 at the location of pixel $p_{0,0}$ and its eight immediate neighboring binary data values are checked to determine whether the current pixel $p_{0,0}$ is the center pixel in a luminance transition range of a slant image edge (step 702). As noted, the binary value corresponding to the location of the current pixel $p_{0,0}$ is $b_{0,0}$, and the binary values corresponding to the eight neighboring pixels of the current pixel $p_{0,0}$, are $b_{i,j}$, i, j=−1, 0, 1, excluding $b_{0,0}$ itself. Based on said binary pattern data $b_{i,j}$, wherein i, j=−1, 0, 1, a pattern matching process is performed to determine whether the binary data matches one of the example patterns 600 for approximately ±45° direction edge shown by example in FIG. 6. Altogether, there are eight patterns 600 in FIG. 6, identified as (a) through (h). If the nine binary pattern data $b_{i,j}$ i,j=−1,0,1 in FIG. 5B (shown in a dashed box 520 in FIG. 5B and corresponding to the pixels 320 in FIG. 5A) matches one of the patterns shown in FIG. 6, then the current pixel $p_{0,0}$ is considered as a center pixel in a luminance transition range of an approximately ±45° direction edge (step 704). In addition, the luminance transition range is considered as 3 pixels wide. In that case, no further checking is needed at the current pixel location and the process moves to the next pixel position (step 706).

If the nine binary pattern data 520 in FIG. 5B does not match any of the patterns 600 shown in FIG. 6, then the checking process continues to determine whether the current pixel $p_{0,0}$ is the center pixel in a luminance transition range other than an approximately ±45° slant edge. As such, the closest four neighboring binary pattern data, $b_{-1,0}$, $b_{1,0}$, $b_{0,-1}$ and $b_{0,1}$, are checked first (step 708). If $b_{-1,0}$ and $b_{1,0}$ have different values, and $b_{0,-1}$ and $b_{0,1}$ also have different values, then the current pixel $p_{0,0}$ is considered as a candidate for being the center pixel in a luminance transition range of a slant edge. These conditions can be expressed according to the example relation:

$$(b_{-1,0} - b_{1,0}) * (b_{0,-1} - b_{0,1}) \neq 0 \quad (4)$$

If condition (4) is not satisfied (i.e., it is false), then the current pixel $p_{0,0}$ is not a center pixel in the luminance transition range of a slant image edge, and no further checking is needed at the current pixel location, so that the process moves to the next position (step 706). Otherwise, if condition (4) is satisfied (i.e., true), then the other four binary pattern data, $b_{-1,-1}$, $b_{-1,1}$, $b_{1,-1}$ and $b_{1,1}$, are checked (step 710). If $b_{-1,-1}$ and $b_{-1,1}$ both have the same value as $b_{-1,0}$, and also $b_{1,-1}$ and $b_{1,1}$ both have the same value as $b_{1,0}$, then the current pixel $p_{0,0}$ is considered as a center pixel in a luminance transition range of a slant edge. In addition, it can be assumed that the luminance transition range centered with the current pixel is at least 3 pixels wide. These above conditions can be expressed according to the example relation:

$$\sum_{i=-1,1} \sum_{j=-1,1} |b_{i,j} - b_{i,0}| = 0 \qquad (5)$$

If condition (5) is not satisfied (i.e., it is false), then the current pixel $p_{0,0}$ is not a center pixel in the luminance transition range of a slant image edge, and no further checking is needed at the current pixel location, so that the process moves to the next position (step 706).

Otherwise, if condition (5) is satisfied (i.e., true), then as shown by the example steps in FIG. 8, the Luminance Transition Range Detector 140 in FIG. 2 detects the length of the luminance transition range with more binary pattern data involved in the checking process. In the Luminance Transition Range Detector 140, the detection of the luminance transition range starts from columns 2 and −2 around the current pixel $p_{0,0}$ in the binary pattern 500 such as in FIG. 5B, and goes left and right simultaneously (step 800). Each time two more columns of the binary pattern data are included, one from the left side and one from the right side of the current pixel.

For example, initially the binary values $b_{-1,-2}$, $b_{0,-2}$ and $b_{1,-2}$ from column −2, and the binary values $b_{-1,2}$, $b_{0,2}$ and $b_{1,2}$ from column 2 are included in the process. If $b_{-1,-2}$, $b_{0,-2}$ and $b_{1,-2}$ each has the same value as $b_{-1,-1}$, $b_{0,-1}$ and $b_{1,-1}$, respectively, and $b_{-1,2}$, $b_{0,2}$ and $b_{1,2}$ each has the same values $b_{-1,1}$, $b_{0,1}$ and $b_{1,1}$, respectively, then the pixel corresponding to $b_{0,-2}$ and the pixel corresponding to $b_{0,2}$ can also be considered as being in the luminance transition range of the edge, so that is can be assumed that the luminance transition range is at least 5 pixels wide.

Using the same method, column −3 and column 3 of the binary pattern data can also be checked. If data in column −3 are the same as those in column −2, and meanwhile data in column 3 are the same as those in column 2, then it can be assumed that the luminance transition range is at least 7 pixels wide.

As such, in general, after column k−1 and column −(k−1) are checked, wherein the luminance transition range is assumed to be at least 2*(k−1)+1 pixels wide, then column k and column −k can be checked, where $$2 \leq k \leq \frac{W-1}{2}.$$

For example, to check the binary pattern data in column k and column −k (step 802), the following example condition according to the above description, is utilized:

$$\sum_{i=-1,0,1} (|b_{i,k} - b_{i,k-1}| + |b_{i,-k} - b_{i,-k+1}|) = 0 \qquad (6)$$

If condition (6) is satisfied (i.e., true), then column k and column −k have the same data as that in column k−1 and column −(k−1), respectively, and it can be assumed that the luminance transition range is at least 2*k+1 pixels wide. Then, so long as there is another column to consider (step 804), the process is extended to the additional columns as noted above (step 806).

Therefore, such a checking process can continue until either condition (6) is not true, wherein the process proceeds to step 810, or until all the binary pattern data in the rectangular window have been checked according to steps 802, 804 and 806. For example, assuming that the checking process has reached column k and column −k, if condition (6) is false, then the detection process stops for the current pixel $p_{0,0}$ location and the luminance transition range is considered as 2*(k−1)+1 pixels wide (step 810). However, if condition (6) is true but k equals to $$\frac{W-1}{2}$$

(step 804), indicating that all the binary data inside the rectangular window have been checked, the detection process stops for the current pixel $p_{0,0}$ location and the luminance transition range is considered as (2*k+1)=W pixels wide (step 808).

In the above process, detecting the luminance transition range for other than an approximately ±45° edge is conducted according to the condition in relation (6), wherein the detection starts with k=2 (step 800). Each time the binary pattern data in column k and column −k are compared with that in column k−1 and column −(k−1), respectively. If they are the same, and $$k < \frac{W-1}{2}$$

(step 804), then k is increased by 1 (step 806) and the same checking process continues. If they are the same, and $$k = \frac{W-1}{2},$$

then the checking terminates for the current pixel $p_{0,0}$ location and the luminance transition range is considered as W pixels wide centered with the current pixel $p_{0,0}$ (step 808).

If the binary pattern data in column k and column −k are not the same as that in column k−1 and column −(k−1), respectively, then the checking process terminates for the current pixel $p_{0,0}$ location and the luminance transition range is considered as 2*(k−1)+1 pixels wide, centered with the current pixel (810).

As such, the example detection system 100 and method according to the present invention, described herein, determines both the center position and the luminance transition range of slant image edge. This allows separate or different processing of the detected pixels from other image areas. The quality of image edges, especially slant edges, can be preserved while the other image areas can still be effectively enhanced. Such a detection method is useful not only in image detail enhancement, but also in image processing techniques wherein image edges must be processed separately or differently from the other image areas.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned detection system according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detecting the location and luminance transition range of a slant image edge in a digital image comprising pixels, the method comprising the steps of:
    (a) defining a two-dimensional window in the digital image;
    (b) determining a variance value for a plurality of pixels around a selected pixel inside the window;
    (c) based on the variance value, determining if the selected pixel is in an edge region;
    (d) if the selected pixel is in an edge region, then generating a binary pattern for the pixels in the window based on the mean value of at least said plurality of pixels in the window, the binary pattern comprising binary values corresponding to the pixel values;
    (e) based on the binary pattern data, determining if the selected pixel is essentially a center pixel in a luminance transition range of a slant edge; and
    (f) if the selected pixel is essentially a center pixel in a luminance transition range of a slant edge, then determining the length of the luminance transition range of the slant image edge.

2. The method of claim 1, wherein:
    in step (a) the window is a W×H window including L=W×H pixels, wherein the window is centered around the selected pixel; and
    in step (b) determining a variance value σ for said plurality of pixels is according to the relation:

$$\sigma = \frac{1}{L} \sum_{i=-1,0,1} \sum_{j=-\frac{W-1}{2}}^{\frac{W-1}{2}} |I_{i,j} - m|$$

wherein i,j are row and column indices for the window,
$I_{i,j}$ represents the luminance value of a window pixel $p_{i,j}$ at row i and column j, such that selected pixel is at row 0, column 0, and
m represents the mean value of said plurality of pixels.

3. The method of claim 2, wherein:

$$m = \frac{1}{L} \sum_{i=-1,0,1} \sum_{j=-\frac{W-1}{2}}^{\frac{W-1}{2}} I_{i,j}.$$

4. The method of claim 1, wherein in step (c) determining if the selected pixel is in an edge region, further comprises the steps of:
    comparing said variance value to a threshold T; and
    if the variance value is not smaller than T, then the selected pixel is in an edge region.

5. The method of claim 1, wherein in step (e) the binary pattern data are used in a pattern matching process to determine if the selected pixel is the center pixel in a luminance transition range of an approximately ±45° direction edge, and if no pattern is matched, then based on the binary pattern data, performing a checking process to determine if the selected pixel is a center pixel in a luminance transition range other than an approximately ±45° direction edge.

6. The method of claim 1, wherein step (f) further includes the steps of: if the selected pixel is determined to be a center pixel in a luminance transition range of an approximately ±45° direction edge, then considering the length of the luminance transition range as three pixels wide without performing further checking, otherwise, if the selected pixel is determined to be a center pixel in a luminance transition range other than an approximately ±45° direction edge, then determining the luminance transition range based on the binary pattern data.

7. The method of claim 1, wherein in step (d) generating the binary pattern further comprises the steps of:
    determining the mean value of at least said plurality of pixels in the window; and
    comparing the luminance value of each pixel to the mean value, wherein if the pixel luminance value is less than the mean value then a binary value is selected for that pixel, otherwise, another binary value is selected for that pixel, wherein the binary values form said binary pattern.

8. The method of claim 7, wherein in step (e) the binary values corresponding to the selected pixel and its neighboring pixels are used in a pattern matching process to determine if the selected pixel is the center pixel in a luminance transition range of a slant edge.

9. The method of claim 8, wherein in step (e) the binary values corresponding to the selected pixel and its neighboring pixels are compared to one or more binary patterns corresponding to said slant edge, wherein if a match is found, then the selected pixel is the center pixel in a luminance transition range of the slant edge.

10. The method of claim 7, wherein:
    in step (a) the window is a W×H window including L=W×H pixels, wherein the window is centered around the selected pixel;

in step (d) the binary values $b_{i,j}$ are defined according to the relation:

$$b_{i,j} = \begin{cases} 0 & \text{if } I_{i,j} < m \\ 1 & \text{if } I_{i,j} \geq m \end{cases}$$

wherein i,j are row and column indices for the window,
$I_{i,j}$ represents the luminance value of a window pixel $p_{i,j}$ at row i and column j, such that selected pixel is at row 0, column 0, and
m represents the mean value of said plurality of pixels; and
in step (e) the binary values corresponding to the selected pixel and its neighboring pixels are used in a pattern matching process to determine if the selected pixel is the center pixel in a luminance transition range of a slant edge.

11. The method of claim 10, wherein the pattern matching process is performed by comparing the binary values corresponding to the selected pixel and its neighboring pixels, $b_{i,j}$ $_{i,j}$=-1,0,1, with one or more binary patterns corresponding to said slant edge, wherein if a match is found, then the selected pixel is the center pixel in a luminance transition range of the slant edge.

12. The method of claim 11, wherein said one or more binary patterns corresponding to said slant edge are selected from the following eight binary patterns:

```
0 0     1 0     1 1     1 1 1
1       0       1       0 1 1
0 1     1 1     1 1     0 0 1

1 1     0 1     0 0     0 0 0
0       1       0       1 0 0
1 0     0 0     0 0     1 1
```

13. The method of claim 1, wherein:
in step (e) determining if the selected pixel is the center pixel in a luminance transition range other than an approximately ±45° direction slant edge, further comprises the steps of determining if both of the following two relations:

$$(b_{-1,0} - b_{1,0}) * (b_{0,-1} - b_{0,1}) \neq 0, \sum_{i=-1,1} \sum_{j=-1,1} |b_{i,j} - b_{i,0}| = 0,$$

are true, such that if both of said two relation are true, then the selected pixel is a center pixel in the luminance transition range other than an approximately ±45° slant image edge.

14. The method of claim 13, wherein in step (f) determining the length of the luminance transition range other than an approximately ±45° edge further comprises the steps of:
for a column k in the binary pattern, wherein $$2 \leq k \leq \frac{W-1}{2},$$

initially selecting k=2, and in a loop indexed around k, performing the steps of:
comparing the binary values in column k and column -k of the binary pattern with those in column k-1 and column -(k-1) of the binary pattern, respectively,
if the compared values are the same and $$k < \frac{W-1}{2},$$

then k is increased by 1 and the comparison is repeated, otherwise if the compared values are the same and $$k = \frac{W-1}{2},$$

then the loop terminates for the selected pixel, and the luminance transition range is selected as W pixels wide centered around the selected pixel, and
if the compared values are not the same, then the loop terminates for the selected pixel, and the luminance transition range is selected as 2*(k-1)+1 pixels wide centered around the selected pixel.

15. The method of claim 14, wherein the steps of comparing the binary values in column k and column -k of the binary pattern with those in column k-1 and column -(k-1) of the binary pattern, respectively, comprises the steps of determining if the following condition:

$$\sum_{i=-1,0,1} (|b_{i,k} - b_{i,k-1}| + |b_{i,-k} - b_{i,-k+1}|) = 0,$$

is true for the selected pixel and its neighboring pixels, such that if the condition is true, then said compared values are the same.

16. A detection system that detects the location and luminance transition range of a slant image edge in a digital image including pixels, comprising:
an edge region detector that determines if a selected pixel in a two-dimensional window of pixels in the digital image is in an edge region in the window; and
a binary pattern data generator configured such that if the selected pixel is in an edge region, the binary pattern data generator generates a binary pattern for the pixels in the window based on the mean value of a plurality of pixels in the window, the binary pattern comprising binary values corresponding to the pixel values;
a slant edge center locator configured such that if the selected pixel is in an edge region, the slant edge center locator uses a binary pattern comprising binary values that correspond to pixel values in the window, to determine if the selected pixel is essentially a center pixel in a luminance transition range of a slant edge; and
a luminance transition range detector configured such that if the selected pixel is essentially a center pixel in a luminance transition range of a slant edge, then the luminance transition range detector determines the length of the luminance transition range of the slant image edge.

17. The detection system of claim 16, wherein the edge region detector further determines a variance value for a plurality of pixels around the selected pixel inside said window, and based on the variance value determining if the selected pixel is in an edge region.

18. The detection system of claim 17, wherein:
the window is a W×H window including L=W×H pixels, wherein the window is centered around the selected pixel; and
the edge region detector determines a variance value σ for said plurality of pixels is according to the relation:

$$\sigma = \frac{1}{L} \sum_{i=-1,0,1} \sum_{j=-\frac{W-1}{2}}^{\frac{W-1}{2}} |I_{i,j} - m|$$

wherein i,j are row and column indices for the window, $I_{i,j}$ represents the luminance value of a window pixel $p_{i,j}$ at row i and column j, such that selected pixel is at row 0, column 0, and
m represents the mean value of said plurality of pixels.

19. The detection system of claim 18, wherein:

$$m = \frac{1}{L} \sum_{i=-1,0,1} \sum_{j=-\frac{W-1}{2}}^{\frac{W-1}{2}} I_{i,j}.$$

20. The detection system of claim 17, wherein the edge region detector further determines if the selected pixel is in an edge region, by comparing said variance value to a threshold T, such that if the variance value is not smaller than T, then the selected pixel is in an edge region.

21. The detection system of claim 16, wherein the binary pattern data generator further determines the mean value of a plurality of pixels in the window, and compares the luminance value of each pixel to the mean value, wherein if the pixel luminance value is less than the mean value then a binary value is selected for that pixel, otherwise, another binary value is selected for that pixel, wherein the binary values form said binary pattern.

22. The detection system of claim 21, wherein:
the window is a W×H window including L=W×H pixels, wherein the window is centered around the selected pixel;
the binary values $b_{i,j}$ are defined according to the relation:

$$b_{i,j} = \begin{cases} 0 & \text{if } I_{i,j} < m \\ 1 & \text{if } I_{i,j} \geq m \end{cases}$$

wherein i,j are row and column indices for the window, $I_{i,j}$ represents the luminance value of a window pixel $p_{i,j}$ at row i and column j, such that selected pixel is at row 0, column 0, and
m represents the mean value of said plurality of pixels; and
the slant edge center locator uses the binary values corresponding to the selected pixel and its neighboring pixels in a pattern matching process to determine if the selected pixel is the center pixel in a luminance transition range of a slant edge.

23. The detection system of claim 22, wherein the slant edge center locator performs the pattern matching process by comparing the binary values corresponding to the selected pixel and its neighboring pixels, $b_{i,j}$ i,j=−1,0,1, with one or more binary patterns corresponding to said slant edge, wherein if a match is found, then the selected pixel is the center pixel in a luminance transition range of the slant edge.

24. The detection system of claim 23, wherein said one or more binary patterns corresponding to said slant edge are selected from the following eight binary patterns:

| 0 0 | 1 0 | 1 1 | 1 1 1 |
| 1   | 0   | 1   | 0 1 1 |
| 0 1 | 1 1 | 1 1 | 0 0 1 |

| 1 1 | 0 1 | 0 0 | 0 0 0 |
| 0   | 1   | 0   | 1 0 0 |
| 1 0 | 0 0 | 0 0 | 1 1   |

25. The detection system of claim 24, wherein:
the luminance transition range detector determines if the selected pixel is the center pixel in a luminance transition range of other than said slant edge direction, by determining if both of the following two relations:

$$(b_{-1,0} - b_{1,0}) * (b_{0,-1} - b_{0,1}) \neq 0, \quad \sum_{i=-1,1} \sum_{j=-1,1} |b_{i,j} - b_{i,0}| = 0,$$

are true, such that if both of said two relation are true, then the selected pixel is a center pixel in the luminance transition range other than an approximately ±45° slant image edge.

26. The detection system of claim 25, wherein the luminance transition range detector further determines the length of the luminance transition range other than an approximately ±45° direction edge by a process loop, such that for a column k in the binary pattern, wherein $$2 \leq k \leq \frac{W-1}{2},$$

and initially k=2, and in said loop indexed around k, the luminance transition range detector:
compares the binary values in column k and column −k of the binary pattern with those in column k−1 and column −(k−1) of the binary pattern, respectively,
checks if the compared values are the same and $$k < \frac{W-1}{2},$$

and if so, then increases k by 1 and repeats the comparison,
checks if the compared values are the same and $$k = \frac{W-1}{2},$$

and if so, then terminates the loop for the selected pixel, and selects the luminance transition range as W pixels wide centered around the selected pixel, and checks if the compared values are not the same, and if so, then terminates the loop for the selected pixel, and selects the luminance transition range as 2*(k−1)+1 pixels wide centered around the selected pixel.

27. The detection system of claim 26, wherein the luminance transition range detector compares the binary values in column k and column −k of the binary pattern with those in column k−1 and column −(k−1) of the binary pattern, respectively, by determining if the following condition:

$$\sum_{i=-1,0,1} (|b_{i,k} - b_{i,k-1}| + |b_{i,-k} - b_{i,-k+1}|) = 0,$$

is true for the selected pixel and its neighboring pixels, such that if the condition is true, then said compared values are the same.

28. The detection system of claim 16, wherein the slant edge center locator further uses the binary pattern data to determine if the selected pixel is the center pixel in a luminance transition range of an approximately ±45° direction edge, and if no pattern is matched, then based on the binary pattern data, performs a checking process to determine if the selected pixel is a center pixel in a luminance transition range other than an approximately ±45° direction edge.

29. The detection system of claim 28, wherein the slant edge center locator further uses the values of the selected pixel and its neighboring pixels in a pattern matching process to determine if the selected pixel is the center pixel in a luminance transition range of a slant edge.

30. The detection system of claim 16, wherein the luminance transition range detector is further configured such that if the selected pixel is essentially a center pixel in a luminance transition range of an approximately ±45° direction edge, then the length of the luminance transition range is considered three pixels wide without performing further checking, otherwise, if the selected pixel is determined to be a center pixel in a luminance transition range other than an approximately ±45° direction edge, then the luminance transition range detector determines the luminance transition range based on the binary pattern data.

* * * * *